United States Patent [19]
Mori

[11] Patent Number: 5,568,650
[45] Date of Patent: Oct. 22, 1996

[54] CONTROL UNIT FOR CONTROLLING READING AND WRITING OF A MAGNETIC TAPE UNIT

[75] Inventor: Yoshiaki Mori, Tokyo, Japan

[73] Assignee: NEC Corporation, Tokyo, Japan

[21] Appl. No.: 894,775

[22] Filed: Jun. 5, 1992

[30] Foreign Application Priority Data

Jun. 6, 1991 [JP] Japan .................................. 3-163842

[51] Int. Cl.$^6$ ...................................................... G06F 3/06
[52] U.S. Cl. .................... 395/872; 395/488; 395/182.13; 364/DIG. 1
[58] Field of Search .................................. 395/275, 925, 395/821, 872, 894, 182.13, 488; 360/90

[56] References Cited

U.S. PATENT DOCUMENTS

| | | | |
|---|---|---|---|
| 5,016,009 | 5/1991 | Whiting et al. | 341/67 |
| 5,159,336 | 10/1992 | Rabin et al. | 341/51 |
| 5,210,851 | 5/1993 | Kato et al. | 395/425 |
| 5,210,866 | 5/1993 | Milligan et al. | 395/575 |
| 5,235,695 | 8/1993 | Pece | 395/497.03 |
| 5,287,478 | 2/1994 | Johnston et al. | 395/425 |

Primary Examiner—Krisna Lim
Assistant Examiner—Viet Vu
Attorney, Agent, or Firm—Sughrue, Mion, Zinn, Macpeak & Seas

[57] ABSTRACT

The control unit for the magnetic tape unit compresses data and writes in a physical block unit in the buffer according to the data write instruction from the host computer or without compressing writes in a logical block unit in the buffer. And, according to the data read instruction from the host computer, the data read from the magnetic tape unit is stored in the buffer and transferred to the host computer. When the read data is an extended format due to compression, the data is expanded before being transferred. When an error occurs in writing data in the magnetic tape unit, information such as the maximum block size and total capacity of data within the buffer is informed to the host computer. In the following data recovery process, the unwritten data within the buffer is recovered in the logical block unit or physical block unit. In the recovery in the logical block unit, when it is the standard format data, it is read as it is and transferred to the host computer. When it is the extended format due to compression, it is read after effecting expansion processing. In the recovery in the physical block unit, the data is not expanded and read to be recovered in the compressed data.

16 Claims, 8 Drawing Sheets

CONTROL UNIT FOR CONTROLLING READING AND WRITING OF A MAGNETIC TAPE UNIT

BACKGROUNDS OF THE INVENTION

1. Field of the Invention

This invention relates to a control unit for controlling a magnetic tape unit, and particularly to a control unit for a magnetic tape unit which makes trailer control by using a means for making compression and expansion of data, a means for making data blocking and a buffer.

2. Description of the Prior Art

Conventionally, the above type of control unit for a magnetic tape unit is used to control, for example, a streamer type magnetic tape unit. Because it takes time to accelerate and stop the tape of the magnetic tape unit, data is stored in a plural blocks within a buffer, then a tape speed is accelerated to continuously write in the plural blocks without stopping the tape as much as possible. Therefore, the termination report of write instruction from the host computer is sent when the storage into the buffer has been completed without being kept waiting until the transferred data is written in the magnetic tape.

But, even if the storage into the buffer has normally completed, it is not certain that the writing into the magnetic tape is normally made, and writing in the magnetic tape may fail due to some failure. In this case, the host computer has to recover the data from the buffer and execute the write instruction again using the recovered data.

For example, a magnetic tape controller which does not have a means for compressing data and a means to make auto-blocking of data recovers one block data corresponding to one write instruction from a buffer according to one data recovery instruction, recovers data until there remains no unwritten data in the buffer to temporarily store in the memory of the host computer, and tries to write again.

In this case, to retry with the host computer, a memory for recovering all unwritten data from the buffer and a record area for recording management information such as address and data length on the memory of each block recovered are needed.

Memory capacity for recovering all data from the buffer does not exceed the capacity of the buffer within the magnetic tape controller. Therefore the host computer can recover all data when it secures memory equalling buffer capacity at most. And, the memory area for storing management information is required to meet the block number to be recovered, but generally the control unit for the magnetic tape unit has a control memory for storing similar control information for data control within the buffer, and the block number to be stored in the buffer is limited to the number which can be managed by the control memory. Therefore, the host computer can recover the data of all buffers when it has control information area corresponding to the block number capable of being controlled by the magnetic tape controller.

Even a control unit for a magnetic tape unit provided with a means for compressing data and a means to make auto-blocking of data has a structure to recover the data for one block corresponding to one write instruction in the same way as above according to one recovery instruction.

But, such a conventional control unit for the magnetic tape unit with means for compressing data and means to make auto-blocking of data has a drawback. Specifically the host computer needs to secure a very large memory to recover, without expansion or decompression data compressed and stored within the buffer. Particularly, when the data compression ratio is high, memory becomes enormous and such a memory may be actually impossible to secure.

To make auto-blocking with the control unit for the magnetic tape unit, each logical block connected in the buffer is not managed, but a physical block unit having them connected is managed. Therefore, there is possibility that the number of logical blocks stored in the buffer becomes enormous. Therefore, when the logical blocks exceeding the number of blocks capable of being managed by the host computer are stored in the buffer, the host computer has a drawback that all data cannot be recovered.

If the host computer, when effecting retry, cannot recover the unwritten data, it cannot proceed processing, resulting in aborting. Retry of writing itself is not a rare matter. For example, in addition to a failure of a device, it occurs by a temporary write error due to defect in the magnetic tape or mingle of dust. Therefore, it becomes a serious problem when the continuous process becomes impossible due to the above and abortion is inevitable.

SUMMARY OF THE INVENTION

An object of this invention is to provide a control unit for a magnetic tape unit removing the necessity of securing a large memory for recovering the unwritten data with the host computer and a large management information area to manage the blocks on the memory.

And another object of this invention is to provide a control unit for a magnetic tape unit capable of efficiently recovering the unwritten data from the buffer and capable of effecting error recovery process without aborting.

The control unit for the magnetic tape unit according to a preferable embodiment of this invention to accomplish the above objects comprises a storage means to store write data from a host computer to the magnetic tape unit and read data from the magnetic tape unit, an I/O control means to control sending and receiving of data to/from the host computer, a data processing means to effect compression and expansion processing of the write data and read data between the storage means and the I/O control means, and a processing means to control the data processing means according to the instruction from the host computer and to effect store read control to the storage means, wherein the processing means has a means to read the unwritten data without expanding the data by the data processing means based on the instruction from the host computer to recover the unwritten data from the storage means and a means to store in the storage means without compressing the data with the data processing means based on the instruction to rewrite the recovered data without effecting the above expanding.

According to another preferable embodiment, the data processing means includes a compression means to compress the write data, a means to transmit the write data without compressing, an expansion means to expand the read data, and a means to transmit the read data without expanding. The above processing means has a means to control the compression and transmission of the write data to the data processing means and a means to control the expansion and transmission of the read data to the data processing means. And the data processing means has a switching means to switch the compression means and the transmission means according to the control signal from the processing means and a switching means to switch the expansion means and the transmission means according to the control signal from the processing means.

According to a further embodiment, the processing means is provided with a means to store in the storage means as a physical block by connecting a plural logical blocks by determining data undergone the compression processing by the data processing means based on the write instruction of the host computer as one logical block, a means to store in the storage means the data not compressed by the data processing means based on the write instruction of the host computer as one logical block, a means to read the data in the storage means based on the read instruction of the host computer in a logical block unit, a means to read the data in the storage means based on the data recovery instruction of the host computer in the physical block unit, and a means to store in the storage means the recovery data based on the rewrite instruction of the data recovered by the recovery instruction in the physical block unit as in a physical block.

Further, according to an embodiment, the processing means, when writing the data having the write data from the host computer as the physical block or logical block stored in the storage means into the magnetic tape unit, includes a means to add information to indicate the presence or not of the compression of data and block number to the physical block or logical block as identification information.

According to another preferable embodiment of this invention, the processing means includes a means to inform to the host computer by calculating the total capacity of the data stored in the storage means and the maximum block size or one of them when a write error occurs in the magnetic tape unit.

The control unit for the magnetic tape unit according to a preferable embodiment of this invention includes a storage means to store the write data from the host computer to the magnetic tape unit and the read data from the magnetic tape unit, an I/O control means to effect sending and receiving control of data to/from the host computer, a data processing means to effect compression and expansion process of the write data and the read data between the storage means and the I/O control means, and a processing means to control the data processing means according to the instruction from the host computer and to effect storage read control to the storage means. This processing means has a means to control compression and transmission of the write data to the data processing means, a means to control expansion and transmission of the read data to the data processing means, a means to store by connecting a plural logical blocks as a physical block in the storage means with data undergone the compression processing by the data processing means based on the write instruction of the host computer as one logical block, a means to store data not undergone the compression by the data processing means based on the write instruction of the host computer as one logical block in the storage means, a means to read the data within the storage means based on the read instruction of the host computer in a logical block unit, a means to read the data in the storage means based on the data recovery instruction of the host computer in the physical block unit, a means to store the recovered data based on the rewrite instruction of the data recovered by the recovery instruction in the physical block unit in the storage means as in a physical block, and a means to inform to the host computer by calculating the maximum block size and the total capacity of data stored in the storage means when a write error to the magnetic tape unit occurs.

Other objects, characteristics and effects of this invention will be obvious from the following description in detail.

DESCRIPTION OF THE PREFERRED EMBODIMENT

Figure 1:
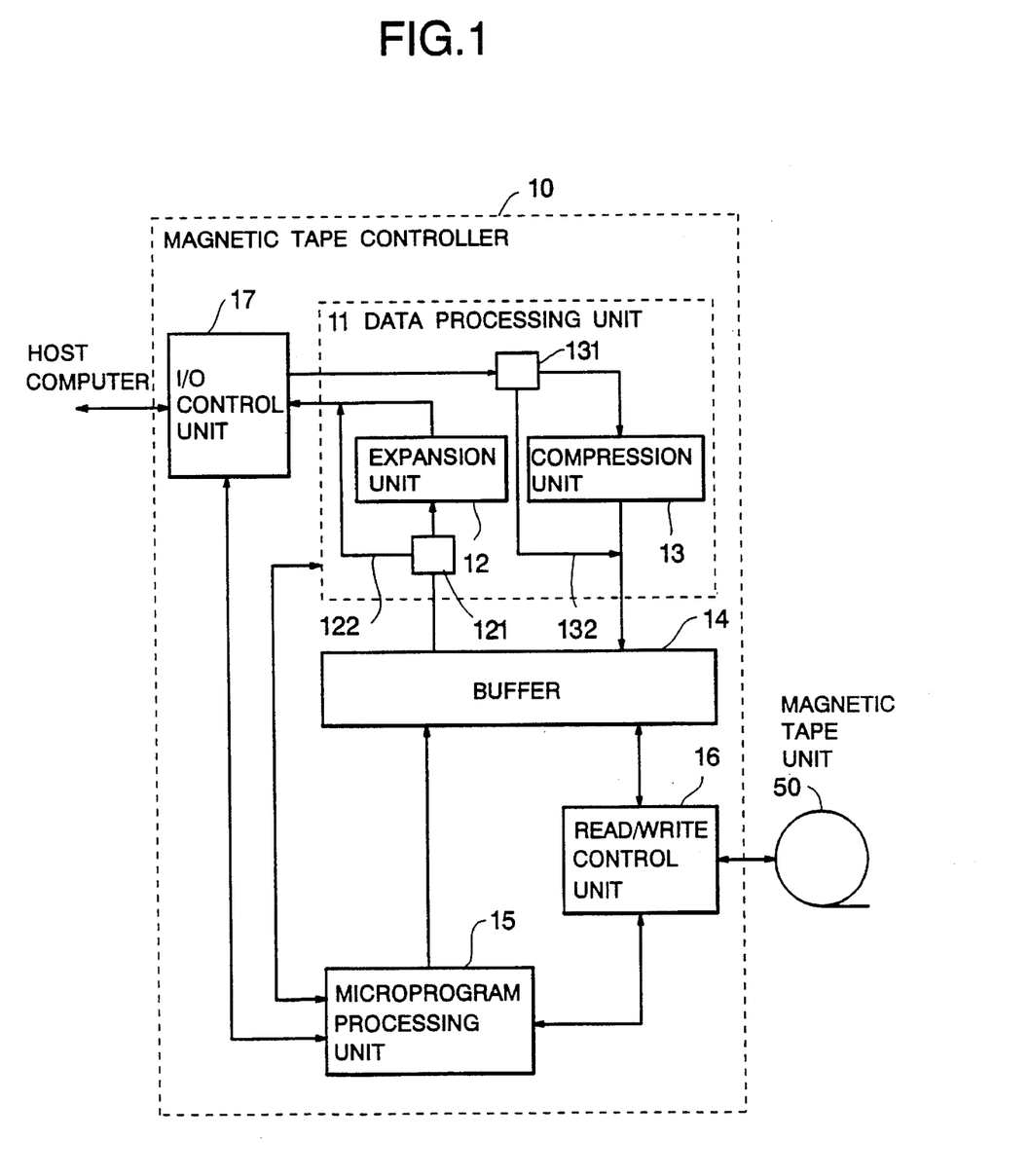
FIG. 1 is a block diagram showing a structure of the control unit for the magnetic tape unit of an embodiment according to this invention.

Preferred embodiments of this invention will be described with reference to FIGS. 1 to 6. FIG. 1 shows a structure of the control unit for the magnetic tape unit according to an embodiment of this invention. In FIG. 1, a control unit 10 for the magnetic tape unit of this embodiment consists of a buffer 14 to store write data from the host computer and read data from a magnetic tape unit 50, an I/O control unit 17 to effect data sending and receiving control to/from the host computer, a data processing unit 11 to treat data from the I/O control unit 17 and send to the buffer 14 or to treat data read from the buffer 14 and send to the I/O control unit 17, a microprogram processing unit 15 to effect operation control of the data processing unit 11 based on the instruction of the host computer and to effect write/read control of the buffer 14, and a read/write control unit 16 to effect data writing and reading to the magnetic tape unit 50.

The data processing unit 11 includes a compression unit 13 to compress the data from the I/O control unit 17 and send to the buffer 14 and an expansion unit 12 to expand the data read from the buffer 14 and send to the I/O control unit 17. The data processing unit 11 includes bypasses 122, 132 to transmit without expanding and compressing data by the expansion unit 12 and the compression unit 13, a switching means 121 to switch the expansion unit 12 side and the bypass 122 side, and a switching means 131 to switch the compression unit 13 side and the bypass 132 side. The data processing unit 11 switches the switching means 121 to the bypass 122 side by non-expansion control signal entered from a microprogram processing unit 15 to transmit without expanding data from the buffer 14. And, by non-compression control signal entered from the microprogram processing unit 15, the switching means 131 is switched to the bypass 132 side to transmit without compressing data from the I/O control unit 17.

Figure 2:
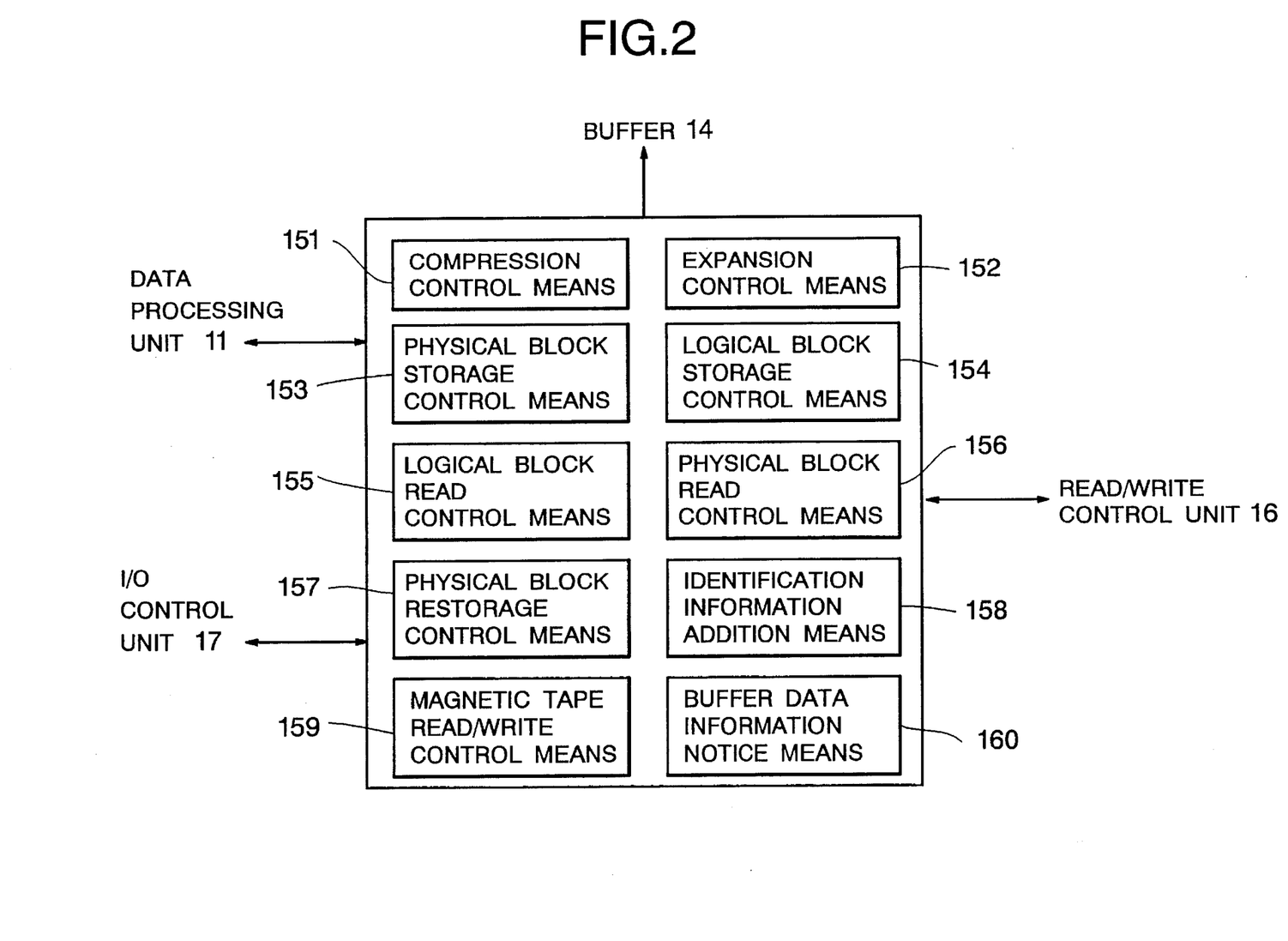
FIG. 2 is a block diagram showing a function of a microprogram processing unit of the control unit for the magnetic tape unit of an embodiment according to this invention.

The microprogram processing unit 15 effects control operation by a built-in microprogram. FIG. 2 shows a function of the microprogram processing unit 15 in a block diagram. The microprogram processing unit 15 includes a compression control means 151 to output control signal of compression or non-compression treated data to the data processing unit 11 according to the instruction from the host computer, an expansion control means 152 to output control signal of expansion or non-expansion treated data to the data processing unit 11 according to the instruction from the host computer, a physical block storage control means 153, a logical block storage control means 154, a logical block read control means 155, a physical block read control means 156, a physical block restorage means 157, an identification information addition means 158, a magnetic tape read/write control means 159, and a buffer data information notice means 160.

The compression control means 151, based on the write instruction without compressing from the host computer or based on the rewrite instruction of data recovered without expanding from the host computer, outputs the non-compression control signal to the data processing unit 11, or outputs the compression control signal to the data processing unit 11 based on the write instruction making compression. The expansion control means 152, based on the read instruction without expanding from the host computer or based on the recovery instruction without expansion of compressed unwritten data of the buffer 14 from the host computer, outputs the non-expansion control signal to the data processing unit 11 or outputs the expansion control signal based on the recovery instruction to expand the unwritten data to the data processing unit 11.

The physical block storage control means 153, based on the write instruction for auto-blocking from the host computer, making the compression data from the data processing unit 11 as one logical block by adding control information per data sent by one write instruction, succeedingly connects the logical blocks to form the physical block to store in the buffer 14.

The logical block storage control means 154, based on the write instruction not auto-blocking (not compressing) from the host computer, stores the non-compression data from the data processing unit 11 as the logical block in the buffer 14.

The logical block read control means 155 reads the data in the buffer 14 in a logical block unit based on the read instruction in a logical block unit from the host computer.

The physical block read control means 156 reads the unwritten data in the buffer 14 in a physical block unit based on the recovery instruction in a physical block unit from the host computer.

The physical block restorage means 157, based on the rewrite instruction of the data recovered in a physical block unit from the host computer, transmits through the data processing unit 11 and stores in the buffer 14 as it is.

The identification information addition means 158 adds identification information such as block number, standard format or extended format when storing data in a block form in the buffer 14 to be described later.

The magnetic tape read/write control means 159, after completing the storage in the buffer 14, effects the write control to the magnetic tape unit 50 and the read control of data from the magnetic tape unit 50 asynchronously.

The buffer data information notice means 160 informs the host computer of information such as data form, total data capacity, and maximum size of physical block stored in the buffer 14. This information is informed as a set in the status to be sent to the host computer. Calculation of these information and the set to the status are effected with the microprogram processing unit 15.

With the control unit for the magnetic tape unit of this embodiment, to make the explanation of the host computer simple, two type of writing including a format not effecting data compression or auto-blocking (hereinafter referred to as standard format) and a format effecting data compression and auto-blocking (hereinafter referred to as extended format) shall be designated. In the following explanation, these designations shall be judged by the code of write instruction issued by the host computer. But, they may be set as an operation mode by another command.

In this embodiment, the I/O instructions issued to the control unit for the magnetic tape unit from the host computer include a write instruction in the standard format without compression processing, a write instruction in the extended format effecting compression processing, a rewrite instruction of the compressed data, a recovering instruction of data within the buffer 14 in a logical block unit, a recovering instruction of data within the buffer 14 in a physical block unit, and an instruction to read data from the magnetic tape unit 50. Such instructions are identified based on different instruction codes by the magnetic tape controller.

Figure 3A:
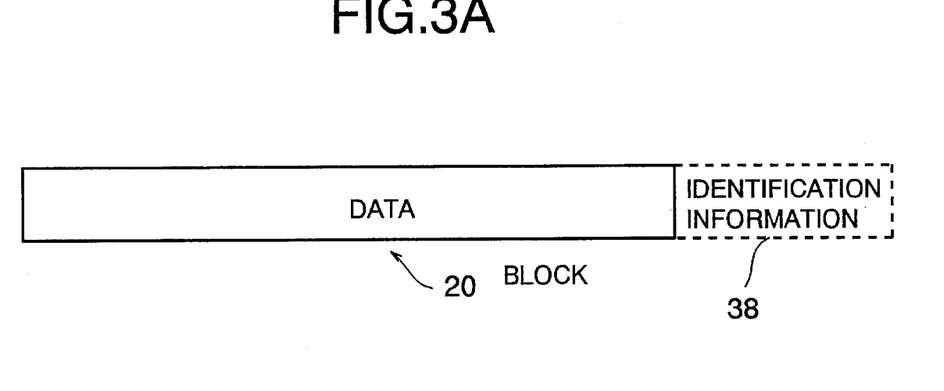
FIG. 3(A), (B) and (C) show data forms treated by the control unit.
Figure 3B:
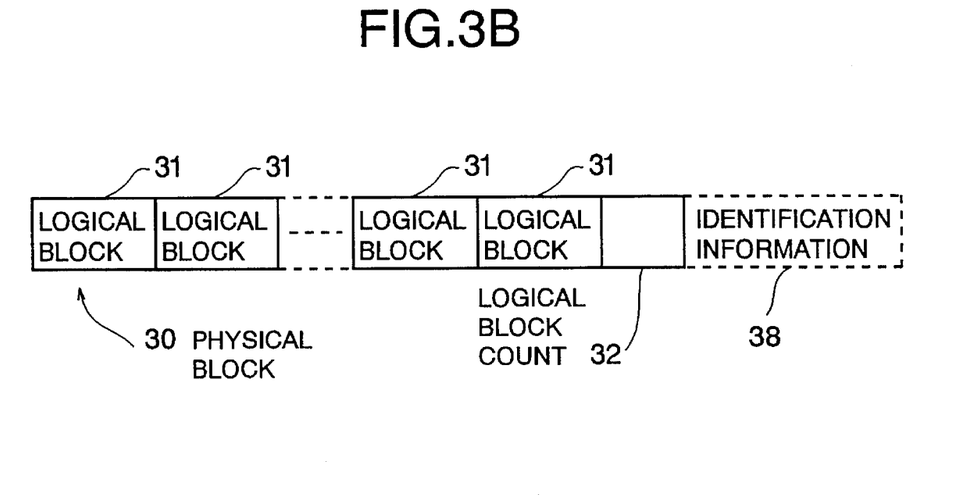
Figure 3C:
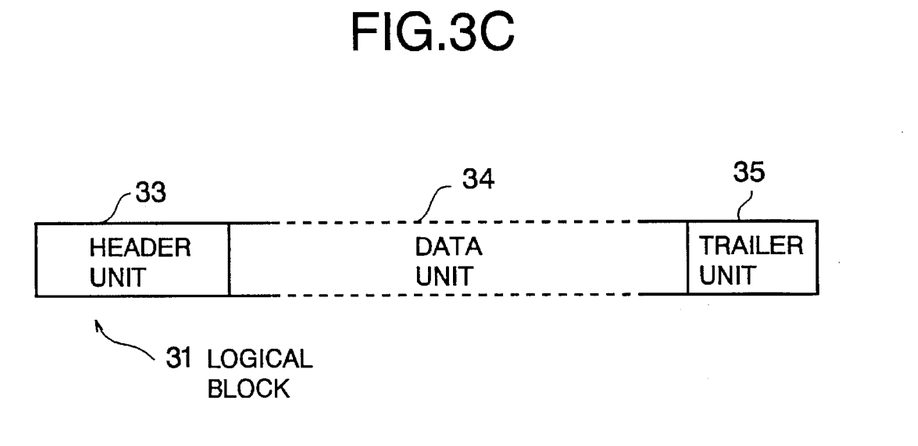

FIGS. 3(A), (B) and (C) show data forms handled by the magnetic tape controller 10. In the form of FIG. 3 (A) or FIG. 3(B), data is stored in the buffer 14 and written in the magnetic tape unit 50.

FIG. 3(A) shows a form for a case that data sent by the write instruction without effecting data compression or auto-blocking is stored in the buffer 14. Data sent by one write instruction is stored as one block 20.

FIG. 3(B) shows a form for a case that data sent by the write instruction effecting data compression and auto-blocking from the host computer is connected in plural to form one physical block and store in the buffer.

FIG. 3(C) shows a form of data to be sent by one write instruction issued from the host computer. This data is treated as a logical block 31, and information of a header unit 33 and a trailer unit 35 are added before and after a data unit 34. Data in the data unit 34 may be compressed. The presence of the compression processing is written in the header unit 33 and referred to when reading. And, the trailer unit 35 is a padding to adjust so that the total byte count of the logical block 31 is a multiple of 32.

The block 20 of FIG. 3(A) is formed of one logical block 31. This means that one physical block is one logical block. The physical block 30 of FIG. 3(B) is structured by connecting the logical block 31 until the previously set conditions (in the range of the physical block 30 size) is met and lastly adding information 32 indicating the logical block number.

Figure 5:
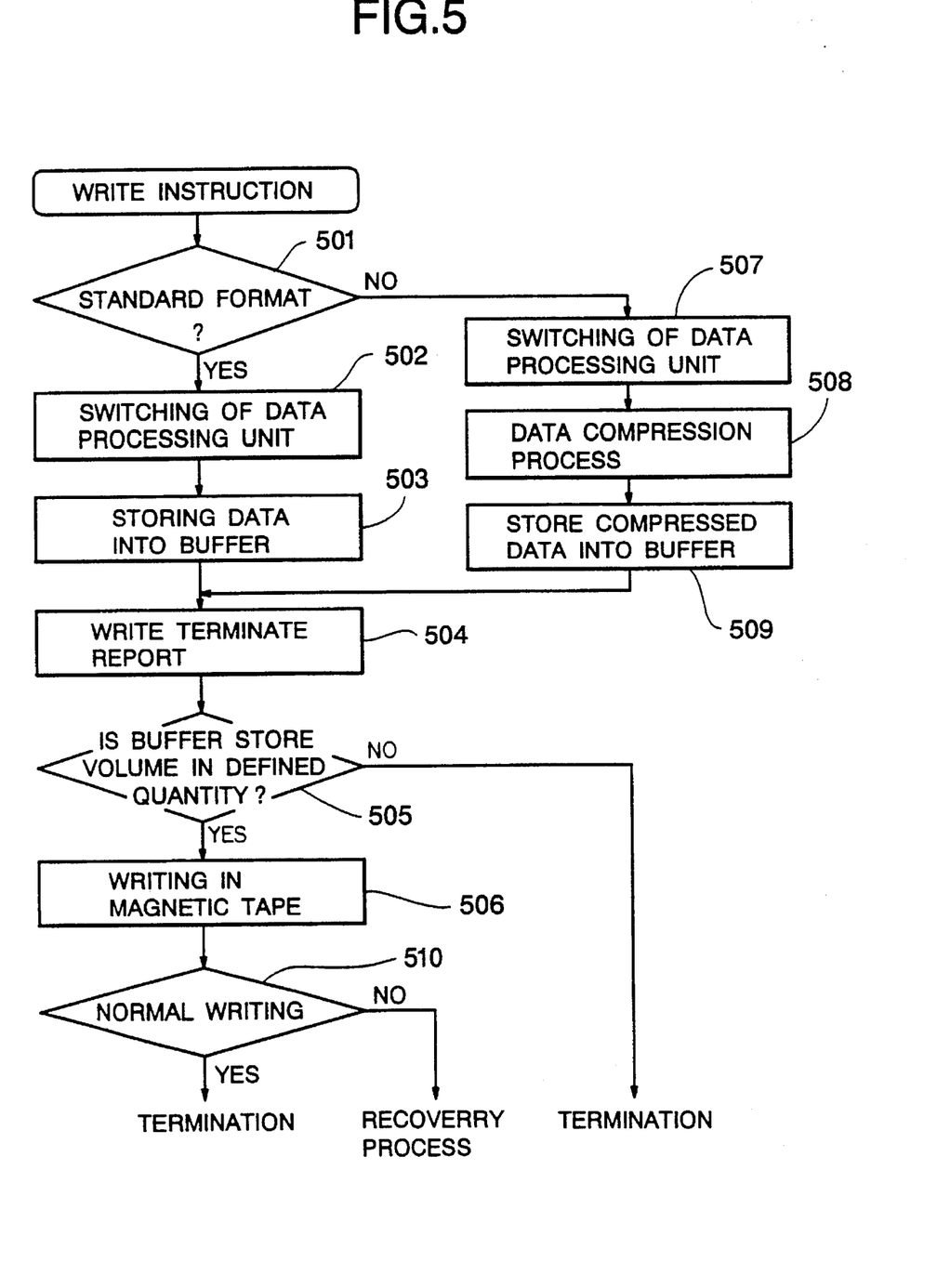
FIG. 5 is a flow chart showing a processing operation based on a data write instruction with the control unit for the magnetic tape unit.
Figure 7A:
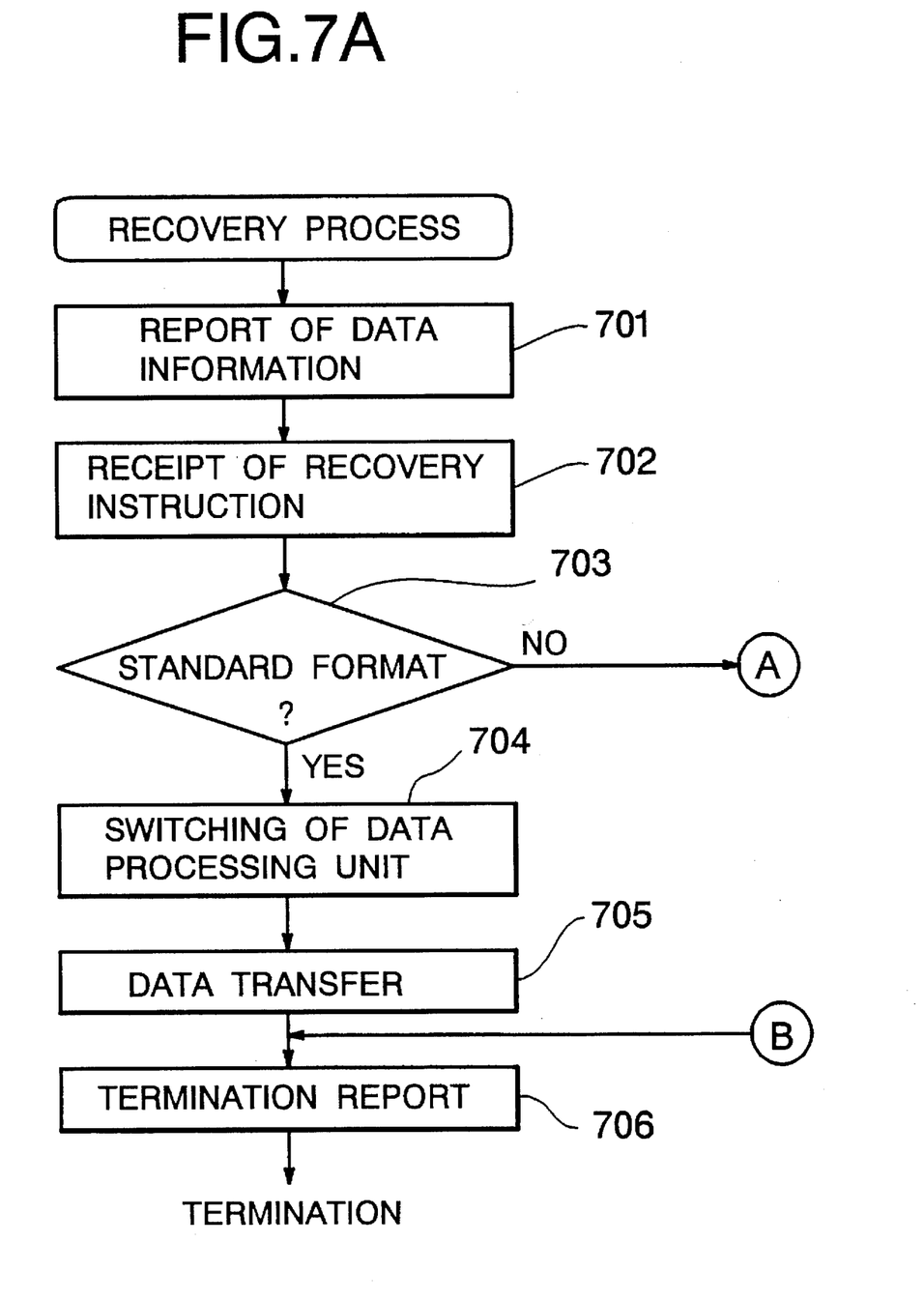
FIG. 7A and FIG. 7B referred collectively hereafter as FIG. 7 is a flow chart showing a processing operation based on a data recovery instruction with the control unit for the magnetic tape unit.
Figure 7B:
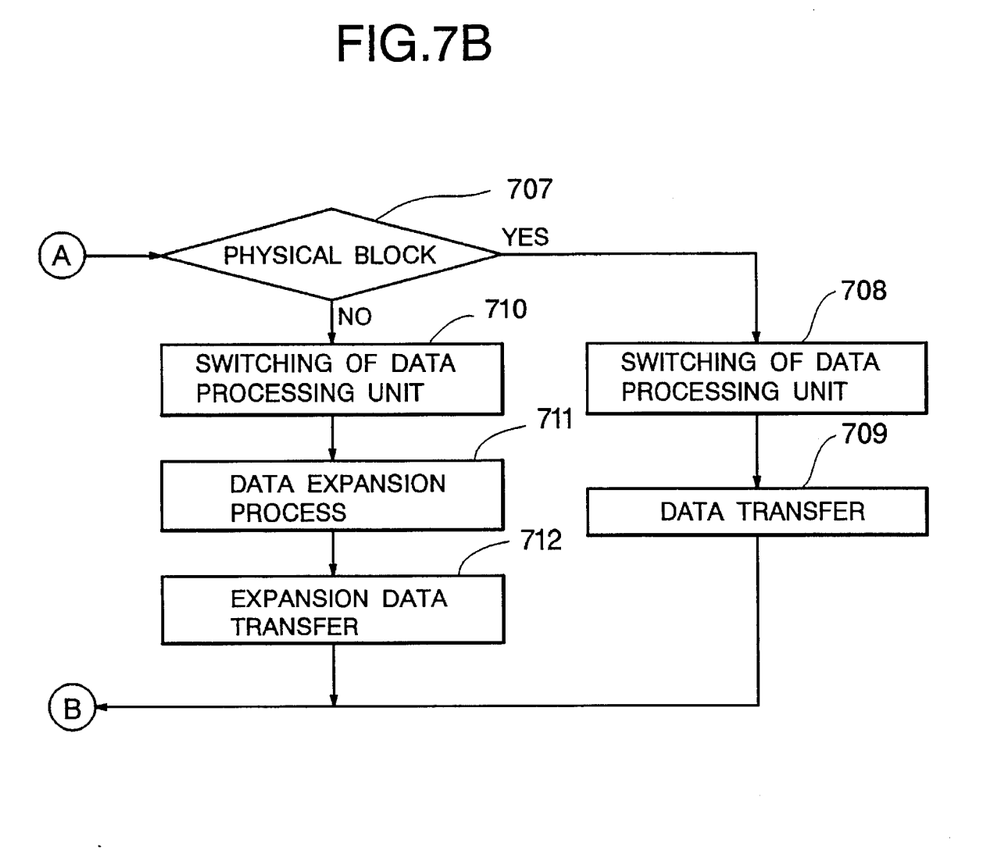

Now, the operation of the magnetic tape controller of this embodiment will be described with reference to FIG. 5 to FIG. 7. First, the operation by the write instruction will be explained with reference to FIG. 5. When the host computer sends the write instruction, the microprogram processing unit 15 judges whether the standard format which does not effect the data compression by the instruction code is designated or the extended format which effects the data compression and auto-blocking is designated (Step 501).

When the write instruction from the host computer designates the standard format, the non-compression control signal is outputted to the data processing unit 11 by the compression control means 151, and the switching means 131 is switched to the bypass 132 side (Step 502). Thus, the write data sent from the host computer via the I/O control unit 17 is transmitted through the data processing unit 11, and stored in the buffer 14 by the logical block storage control means 154 (Step 503). Storage into the buffer 14 is effected in the form of the block 20 (logical block) of FIG. 3(A). When the storage of data according to one write instruction completes, it is reported to the host computer (Step 504). When the write instruction is continuously sent from the host computer, the above processing is repeated to successively store in the buffer 14.

Judging whether the data in the buffer 14 reaches a defined amount (Step 505), and if reached, the magnetic tape read/write control means 159 starts to operate the magnetic tape unit 50, and writes in the magnetic tape unit 50 via the read/write control unit 16 (Step 506). In this case, the identification information addition means 158 writes with the addition of the block number and the identification information 38 as the standard format to each block 20 in the buffer 14 as shown in FIG. 3(A). This identification information 38 is added after the block 20 of FIG. 3(A).

In Step 501, when the write instruction from the host computer has the extended format, the non-compression control signal is outputted to the data processing unit 11 from the compression control means 151, and the switching means 131 is switched to the compression unit 13 side (Step 507). Thus, the write data received from the host computer via the I/O control unit 17 is compression processed by the data processing unit 11 (Step 508). And, the compression-processed data is stored in the buffer 14 by the physical block storage control means 153 (Step 509). The storage in the buffer 14 is made in a form of the logical block 31 of FIG. 3 (C). When the storage of data by one write instruction completes, the termination is reported to the host computer in Step 504.

When the write instruction is successively sent from the host computer, the above processing is repeated and the logical block 31 is connected in the buffer 14 and stored. The logical block 31 is connected until the previously set conditions are met and formed as one physical block 30 as shown in FIG. 3(B).

It is judged whether the data in the buffer 14 reaches a definite amount (Step 505), and if reached, the magnetic tape read/write control means 159 starts the magnetic tape unit 50 to operate and writes in the magnetic tape unit 50 via the read/write control unit 16 (Step 506). At the time, the identification information addition means 158 writes in the physical block 30 within the buffer 14 with the addition of the block number and the identification information 38 as the extended format as shown in FIG. 3(B).

Then, it is judged whether the writing is normally effected in the magnetic tape unit 50 in Step 510. If normally written, the processing terminates, and if there is a write error, an error recovery processing to be described afterward is effected.

Figure 6:
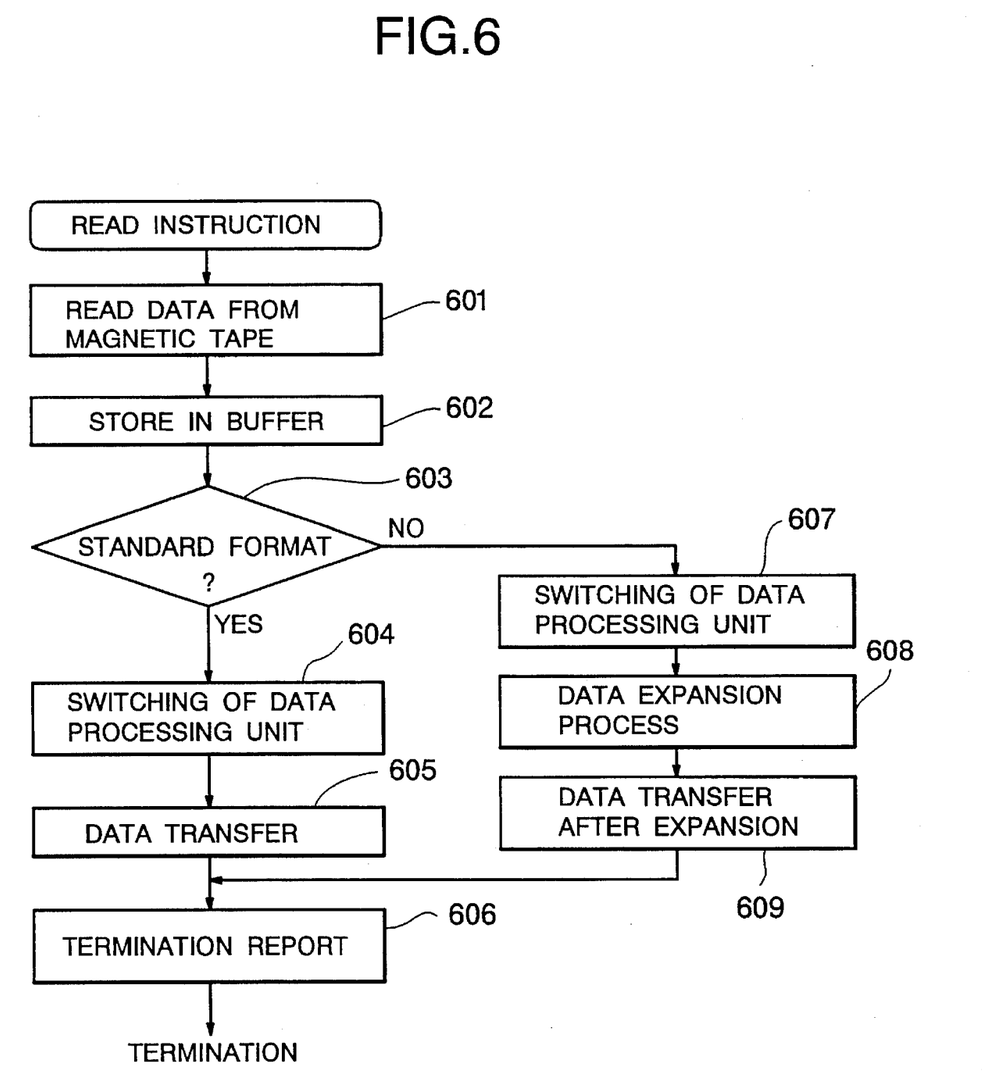
FIG. 6 is a flow chart showing a processing operation based on a data read instruction with the control unit for the magnetic tape unit.

The operation by the read instruction will be described with reference to FIG. 6. When the host computer sends the read instruction, the magnetic tape unit 50 is operated by the magnetic tape read/write control means 159 to read data (Step 601). The data read from the magnetic tape unit 50 is temporarily stored in the buffer 14 (Step 602). Then, the format of the read block is judged according to the identification information 38 added to the block 20 or physical block 30 (Step 603).

When the standard format is in Step 603, the expansion control means 152 of the microprogram processing unit 15 sends the non-expansion control signal to the switching means 121 of the data processing unit 11, and switches the switching means 121 to the bypass 122 side (Step 604). Thus, the logical block read control means 155 reads the data in the buffer 14 in a logical block unit, transmits through the bypass 121, and transfers the data to the host computer via the I/O control unit 17 (605). And, when the transfer of one block 20 completes, the completion is reported to the host computer (Step 606).

In Step 603, when the block read from the magnetic tape unit 50 is the extended format, the expansion control means 152 of the microprogram processing unit 15 sends an expansion control signal to the switching means 121 of the data processing unit 11 and switches the switching means 121 to the expansion unit 12 side (Step 607). Thus, the compressed data in the buffer 14 is read in a logical block unit by the logical block read control means 155 and expansion processed by the expansion unit 12 (Step 608). This expansion processed data is transferred to the host computer via the I/O control unit 17 (Step 609). And, when the data unit 34 contained in one logical block 31 has been transferred, the completion is reported to the host computer (Step 606 ).

A recovery processing operation when an error occurs during writing in the magnetic tape unit 50 will be described with reference to FIG. 7. In Step 510 of FIG. 5, when a write error occurs, the buffer data information notice means 160 of the control unit 10 informs as if the unwritten data in the buffer 14 is the standard format or the extended format, total capacity of the data in the buffer 14, or the calculated information of the maximum block size of the logical block or physical block to the host computer (Step 701). The host computer, based on the above information, judges whether the unwritten data in the buffer 14 is recovered in a logical block unit or in a physical block unit and issues the recovery instruction. When the recovery instruction is issued in a physical block unit, the host computer secures the memory capacity needed to recover the data in view of the information such as the total capacity of the compression data and maximum physical block size within the buffer 14 informed from the magnetic tape control unit 10.

When the control unit 10 receives the recovery instruction from the host computer (Step 702), processing varies according to whether the unwritten data is the standard format or the extended format (Step 703). When it is the standard format, the expansion control means 152 of the microprogram processing unit 15 sends the non-expansion control signal to the switching means 121 of the data processing unit 11 and switches the switching means 121 to the bypass 122 side (Step 704). Thus, the logical block read control means 155 transfers the data in the buffer 14 to the host computer via the I/O control unit 17 by transmitting through the bypass 122 (Step 705). When data for one logical block is recovered, the completion is reported to the host computer (Step 706).

The host computer, when rewriting by using the recovered data, sends the same instruction code as the ordinary write instruction to the control unit 10.

When the extended format is in Step 703, it is judged whether the recovery instruction is a recovery in a logical block unit or a recovery in a physical block unit (Step 707). In case of the recovery instruction in the physical block unit, the expansion control means 152 of the microprogram processing unit 15 sends the non-expansion control signal to the switching means 121 of the data processing unit 11 and switches the switching means 121 to the bypass 122 side (Step 708). Thus, the data in the buffer 14 is read in a physical block unit by the physical block read control means 156, transmitted through the bypass 122, and transferred to the host computer via the I/O control unit 17 (Step 709). When the recovery of the data for one physical block completes, the completion report of Step 706 is made.

The host computer, when rewriting the data recovered in the physical block unit, processes by a write instruction different from the ordinary write instruction. The rewriting is effected by informing to the control unit 10 that the data is one recovered in the physical block form. The control unit 10 informed so, determining the recovered data as data consisting of a plural logical blocks 31 by the physical block restorage control means 157, stores into the buffer 14 as it is (by transmitting through the bypass 132) and rewrites in the magnetic tape unit 50.

Recovery of the logical block unit will be described in Step 707. First, a case requiring the recovery in a logical block unit other than the recovery in the above physical block unit to recover the extended format data will be described with reference to FIG. 4.

Figure 4:
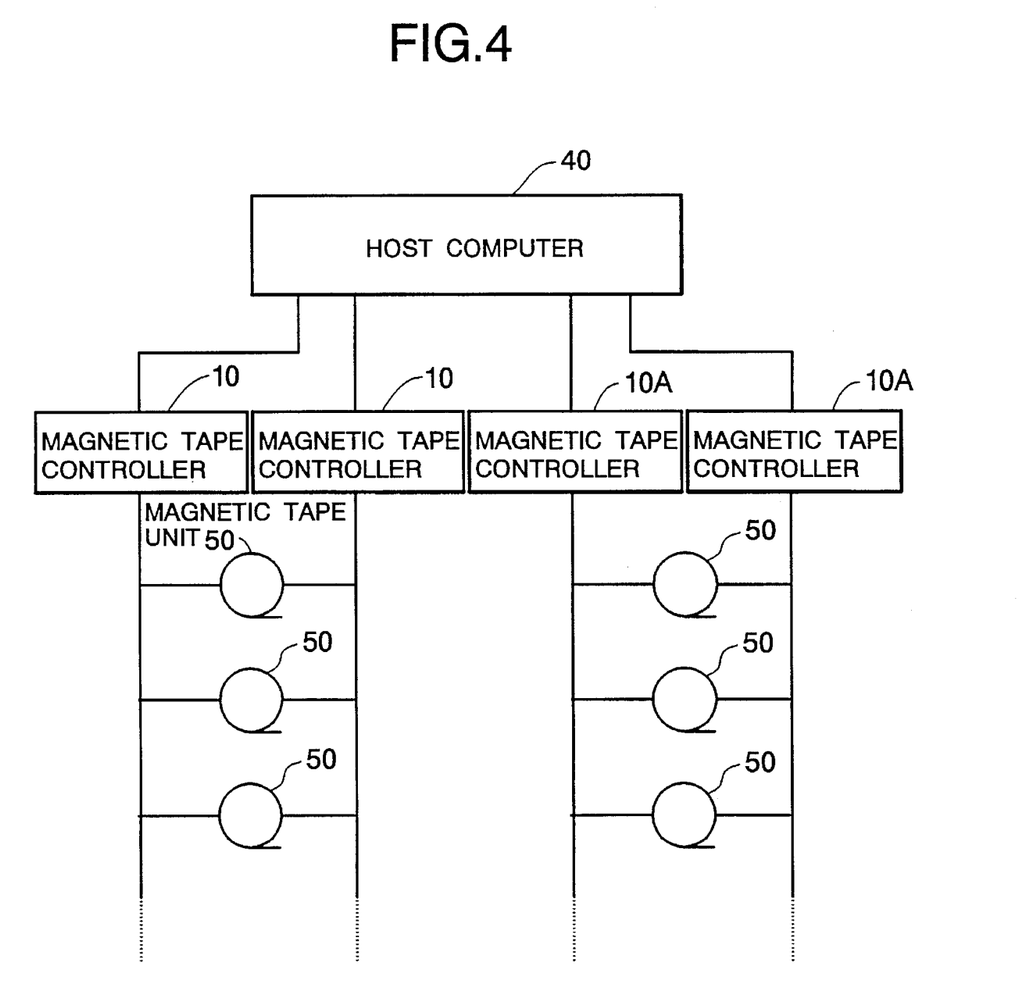
FIG. 4 shows a structural example of a computer system applying the magnetic tape controller according to this invention.

FIG. 4 shows a structural example of the computer system to which the magnetic tape controller of this invention is applied. In this computer system, a magnetic tape controller 10 which can process in the extended format and the standard format and a magnetic tape controller 10A which can make data processing in a standard format alone are connected to the same host computer 40, and the magnetic tape unit 50 is connected in plural to the magnetic tape controllers 10 and 10A. In the above system, when the unwritten data which failed to be written by the magnetic tape controller 10 is recovered in a physical block unit, the contents of the recovered data are compression processed and a plural logical blocks are connected, differing from the original data. Therefore, it is impossible to rewrite the recovered data into the magnetic tape unit 50 which is controlled by the magnetic tape controller 10A capable of processing the standard format only and to reposition for processing. In this case, the recovery instruction in the logical block unit is to be issued.

In recovering the logical block unit, in the magnetic tape controller 10, the expansion control means 152 of the microprogram processing unit 15 sends an expansion control signal to the switching means 121 of the data processing unit 11 and the switching means 121 is switched to the expansion unit 12 side (Step 710). Thus, the logical block read control means 155 reads the compressed data from the buffer 14 in the logical block unit and the expansion unit 12 makes the expansion processing (Step 711). The expansion processed data is transferred to the host computer via the I/O control unit 17 (Step 712). When the transfer of the data unit 34 included in one logical block 31 completes, the completion is reported to the host computer in Step 706.

To rewrite the data recovered in the logical block unit, the same instruction code with the ordinary write instruction is sent to the control unit 10.

As described above, even in the control unit having data compression and auto-blocking functions to make trailer control, making the recovery of the unwritten data in the physical block unit possible for the host computer eliminates the necessity of securing an enormous memory by the host computer to store the recovered data even when the data in a high compression ratio is stored in the buffer 14. When the physical block is structured by connecting many small logical blocks, the number of control information to manage the capacity of the recovered data and memory address is almost the same with the case not effecting the compression of data and auto-blocking, so that an area for recording the control information is not required to be made large.

Since it is not necessary to secure a large control information area to manage the memory of data recovered by the host computer and the block on the memory, it is possible to eliminate the fact that the unwritten data can not be recovered and the error recovery processing cannot be made and the job is aborted.

Among the operating systems, as to a sequential file such as a magnetic tape, when the block number from the leader (BOT) of the recordable range on the magnetic tape is counted, and the positioning of the magnetic tape becomes unknown, repositioning is effected based on the above counting. For example, when writing is retried by recovering the unwritten data in the physical block unit, one execution of I/O instruction causes the positional change for a plural logical blocks. In this case, by adding the logical block number contained within the data by one I/O instruction, the operating system referring to it can compensate the count value managed by itself.

Further, whether the unwritten data in the buffer 14 is recovered in the logical block unit or in the physical block unit can be changed depending on the memory capacity secured for the recovery of the unwritten data by the host computer by making that the host computer can select. And, by effecting the data compression process once to recover the unwritten data in the original form, it becomes possible to write in another memory.

Many operating systems are independent of the ordinary processing and error recovery processing, and when it is necessary to make an error recovery processing, there happens a case that the processing was being effected in what recording format immediately before that. In such a case, by informing to the host computer whether or not the magnetic tape controller is effecting the compression processing of data stored in the buffer 14, the host computer can select the operation for an appropriate error recovery accordingly.

Further, the data capacity after the compression cannot be known by the host computer, but by providing the magnetic tape controller with a means 160 to inform the total capacity of the data undergone the data compression process stored in the buffer 14, the host computer can readily know the memory capacity needed to recover all data in the buffer 14 in the physical block unit.

Similarly, size of the physical block undergone the compression and auto-blocking processing cannot be known by the host computer, but the magnetic tape controller includes the means 160 to inform the maximum block size of the physical block in the buffer to the host computer. Thus, when the host computer recovers the data in the buffer 14 in the physical block unit, the capacity of data which is recovered by one instruction, that is the memory capacity to be secured by the continuous addresses in the memory space within the host computer can be known previously, so that a failure of processing due to a shortage of the memory area during the error recovery processing can be prevented.

In this invention, it is needless to say that variations are possible in addition to the above embodiment. For example, the above embodiment described a case to control by a microprogram. But, there may be provided a processing unit to effect the control operation by the ordinary processing program instead of the microprogram processing unit. It is understood that all variations that fall within the spirit and the scope of this invention are included in the scope of the patent claims.

What is claimed is:

1. A control unit for a magnetic tape unit comprising:

data processing means for transforming non-compressed write data into compressed write data via compression, and for transforming compressed read data from said magnetic tape unit into decompressed read data via expansion;

storage means for storing the compressed write data received from said data processing means and for storing compressed read data received from the magnetic tape unit, said compressed write data in said storage means becoming compressed recovered data based on an instruction from a host computer to recover the compressed write data which are held unwritten to said magnetic tape unit;

I/O control means for transmitting the non-compressed write data, the decompressed read data, and the compressed recovered data to and from the host computer; and microprogram processing means for performing storing and reading control to the storage means and for controlling the data processing means according to the instruction from the host computer, including:

means for reading the compressed recovered data stored in said storage means and held unwritten to said magnetic tape unit without expansion by the data processing means according to a memory capacity of said host computer and a size of said compressed data, and transferring the compressed recovered data read from said storage means to said host computer based on an instruction from the host computer, and means for rewriting the compressed recovered data in said storage means from said host computer without compression by said data processing means based on an instruction from said host computer.

2. A control unit for a magnetic tape unit according to claim 1, wherein said data processing means includes compression means to compress the non-compressed write data;

means to transmit the compressed recovered data without compressing;

expansion means to expand the compressed read data; and means to transmit the compressed recovered data without expanding, and wherein said microprogram processing means includes, means to control the compression and transmission of the non-compressed write data to said data processing means, and means to control the expansion and transmission of the compressed read data to said data processing means.

3. A control unit for a magnetic tape unit according to claim 2, wherein said data processing means includes a switching means to switch said compression means and transmission means according to the control signal from said microprogram processing means, and to switch said expansion means and transmission means according to control signal from said microprogram processing means.

4. A control unit for a magnetic tape unit according to claim 1, wherein said microprogram processing means includes:

means to store the compressed write data based on the write instruction of said host computer as one logical block in said storage means;

means to store in said storage means the non-compressed write data based on a write instruction of said host computer as one logical block;

means to read the compressed read data in said storage means based on a read instruction of said host computer in a logical block unit;

means to read the compressed recovered data in said storage means based on a data recovery instruction of said host computer in said physical block unit; and means to store in said storage means, based on the rewrite instruction of the data recovered in said physical block unit by the recover instruction, said compressed recovered data in the physical block.

5. A control unit for a magnetic tape unit according to claim 4, wherein said microprogram processing means includes means for informing the amount of data and format of data stored in said storage means to said host computer when a write error to said magnetic tape unit occurs.

6. A control unit for a magnetic tape unit according to claim 4, wherein said microprogram processing means includes means for informing the largest block size of the data and format of data stored in said storage means to said host computer when a write error to said magnetic tape unit occurs.

7. A control unit for a magnetic tape unit according to claim 4, wherein said microprogram processing means includes means for informing the total capacity of data and the maximum block size and format of data stored in said storage means to said host computer when a write error to said magnetic tape unit occurs.

8. A control unit for a magnetic tape unit comprising:

data processing means for transforming non-compressed write data into compressed write data via compression, and for transforming compressed read data from said magnetic tape unit into decompressed read data via expansion;

storage means for storing the compressed write data received from said data processing means and for storing compressed read data received from the magnetic tape unit, said compressed write data in said storage means becoming compressed recovered data based on an instruction from a host computer to recover the compressed write data which are held unwritten to said magnetic tape unit;

I/O control means for transmitting the non-compressed write data, the decompressed read data, and the compressed recovered data to and from the host computer; and microprogram processing means for controlling the data processing means according to an instruction from the host computer and for effecting storage read control to the storage means, including:

means for controlling compression and transmission of said non-compressed write data to said data processing means, means for controlling expansion and transmission of said compressed read data to said data processing means, means for storing compressed write data from the data processing means based on the write instruction of said host computer in said storage means as a physical block by connecting a plurality of logical blocks, means for storing the compressed recovered data from said data processing means based on an write instruction of said host computer as one logical block into said storage means, means for reading the compressed read data within said storage means based on a read instruction of said host computer in the logical block unit, means for reading the compressed recovered data in the physical block format stored in said storage means without expansion by the data processing means according to memory capacity of said host computer and size of the data and transferring the compressed recovered data to said host computer based on a data recovery instruction from said host computer, means for rewriting said compressed recovered data based on the rewrite instruction from said host computer, and means for informing the largest block size, and amount and format of accumulated data stored in said storage means to said host computer when write error to said magnetic tape unit occurs.

9. A control unit for a magnetic tape Unit comprising:

a data processing unit for transforming non-compressed write data into compressed write data via compression, and for transforming compressed read data from said magnetic tape unit into decompressed read data via expansion;

storage means for storing the compressed write data received from said data processing means and for storing compressed read data received from said magnetic tape unit, said compressed write data in said storage means becoming compressed recovered data based on an instruction from a host computer to recover the compressed write data which are held unwritten to said magnetic tape unit;

I/O control means for transmitting the decompressed read data, the non-compressed write data, and compressed recovered data to and from the host computer; and microprogram processing means able to control transmission of the compressed write data, the compressed and decompressed read data, and the non-compressed write and compressed recovered data to and from the storage means as directed by the host computer, and able to control the data processing unit as directed by the host computer, including:

means for reading the compressed recovered data from the storage means as directed by the host computer, without decompressing the compressed recovered data, and transmitting the compressed recovered data to the host computer, and means for retransmitting the compressed recovered data from the host computer to the storage means, as directed by the host computer.

10. A control unit as recited in claim 9, wherein said data processing unit includes:

means to compress said non-compressed write data;

means to transmit said compressed write data to said storage means, and means to transmit said compressed recovered data to said storage means without compression;

means to decompress and transmit said compressed read data; and means to transmit said compressed recovered data without decompression, wherein said microprogram processing means includes means for controlling said compression of said non-compressed write data and said decompression of said compressed read data.

11. A control unit as recited in claim 10, wherein said data processing unit includes switching means for controlling whether said compression and decompression take place, such that the switching means is able to switch between compression of said non-compressed write data and non-compression of said compressed recovered data, as directed by said microprogram processing means, and between decompression of said compressed read data and non-decompression of said compressed recovered data, as directed by said microprogram processing means.

12. A control unit as recited in claim 9, wherein said microprogram processing means includes:

means for storing said compressed write data in said storage means as a physical block comprising a plurality of logical blocks, as directed by said host computer;

means for storing said non-compressed write data in said storage means as one logical block, as directed by said host computer;

means for reading compressed read data in logical block format from said storage means in response to a read instruction from said host computer;

means for reading compressed recovered data from said storage means in physical block format in response to a data recovery instruction from said host computer; and means for storing the compressed recovered data in said storage means in response to a rewrite instruction from said host computer.

13. A control unit as recited in claim 9, wherein said microprogram processing means includes:

means for calculating the amount of accumulated data stored in said storage means; and means for alerting said host computer upon occurrence of a write error during writing to said magnetic tape unit.

14. A control unit as recited in claim 9, wherein said microprogram processing means includes:

means for calculating the largest size data block stored in said storage means; and means for alerting said host computer upon occurrence of a write error during writing to said magnetic tape unit.

15. A control as recited in claim 9, wherein said microprogram processing means includes:

means for calculating the amount of accumulated data stored in said storage means;

means for calculating the largest size data block stored in said storage means; and means for alerting said host computer upon occurrence of a write error during writing to said magnetic tape unit.

16. A control unit for a magnetic tape unit comprising:

a data processing unit for transforming non-compressed write data into compressed write data via compression, and for transforming compressed read data from said magnetic tape unit into decompressed read data via expansion;

storage means for storing the compressed write data received from said data processing means and for storing compressed read data received from said magnetic tape unit, said compressed write data in said storage means becoming compressed recovered data based on an instruction from a host computer to recover the compressed write data which are held unwritten to said magnetic tape unit;

I/O control means for transmitting the decompressed read data, the non-compressed write data, and the compressed recovered data between the host computer and the data processing unit; and microprogram processing means able to control transmission of compressed write data, the compressed and the decompressed read data, and the non-compressed write and the compressed recovered data to and from the storage means as directed by the host computer, and able to control the data processing unit as directed by the host computer, including:

means for controlling compression of the non-compressed write data and decompression of the compressed read data, including means for controlling whether compression and decompression take place, means for storing the compressed write data as a physical block comprising a plurality of logical blocks, as directed by the host computer, means for storing the non-compressed write data as one logical block in the storage means, as directed by the host computer, means for reading compressed read data in logical block format from the storage means in response to a read instruction from the host computer, means for reading compressed recovered data in physical block format from the storage means in response to a data recovery instruction from the host computer, without decompressing the compressed recovered data, and transmitting the compressed recovered data to the host computer, means for transmitting the compressed recovered data from the host computer to the storage means, in response to a rewrite instruction from the host computer; and means for calculating the amount of accumulated data stored in the storage means, means for calculating the largest size data block stored in the storage means, and means for alerting the host computer upon occurrence of a write error during writing to the magnetic tape unit.

* * * * *